United States Patent
Arnold et al.

(10) Patent No.: US 8,989,579 B2
(45) Date of Patent: Mar. 24, 2015

(54) OPTICAL DOWNLINK SYSTEM

(71) Applicant: RUAG Schweiz AG, Zürich (CH)

(72) Inventors: Felix Andreas Arnold, Altdorf (CH); Thomas Dreischer, Opfikon (CH)

(73) Assignee: RUAG Schweiz AG, Zurich (CH)

( * ) Notice: Subject to any disclaimer, the term of this patent is extended or adjusted under 35 U.S.C. 154(b) by 108 days.

(21) Appl. No.: 13/675,033

(22) Filed: Nov. 13, 2012

(65) Prior Publication Data

US 2013/0156432 A1   Jun. 20, 2013

(30) Foreign Application Priority Data

Dec. 20, 2011 (EP) ..................................... 11194685

(51) Int. Cl.
*H04B 10/118* (2013.01)

(52) U.S. Cl.
CPC .................................... *H04B 10/118* (2013.01)
USPC ............. 398/67; 398/121; 398/125; 398/131; 398/128; 370/323; 370/347; 370/316; 455/12.1

(58) Field of Classification Search
CPC ..................................................... H04B 10/118
USPC ............... 398/118, 119, 67; 370/321; 455/17, 455/12.1
See application file for complete search history.

(56) References Cited

U.S. PATENT DOCUMENTS

| | | | |
|---|---|---|---|
| 4,425,639 A * | 1/1984 | Acampora et al. | 370/323 |
| 5,119,225 A * | 6/1992 | Grant et al. | 398/123 |
| 5,610,750 A * | 3/1997 | Popescu et al. | 398/118 |
| 6,127,967 A * | 10/2000 | Ghazvinian et al. | 342/354 |
| 6,449,267 B1 * | 9/2002 | Connors | 370/347 |
| 6,545,787 B1 * | 4/2003 | Lenormand et al. | 398/121 |
| 6,795,655 B1 * | 9/2004 | Sidorovich et al. | 398/128 |
| 7,177,550 B1 * | 2/2007 | Smith | 398/212 |
| 2003/0174663 A1 * | 9/2003 | Dillon | 370/316 |
| 2010/0022186 A1 * | 1/2010 | Walley | 455/12.1 |

* cited by examiner

*Primary Examiner* — David Payne
*Assistant Examiner* — Omar S Ismail
(74) *Attorney, Agent, or Firm* — McCormick, Paulding & Huber LLP

(57) ABSTRACT

Optical downlink system (10) and method of optical data transmission between a remote terminal (20) having a number of n optical communication terminals (OT1-OTn), and a ground terminal (30) comprising a cluster of n optical ground stations (OGS1-OGSn) connected by n optical downlink channels (DL1-DLn) respectively n optical uplink channels (UC1-UCn) characterised by a spatial separation of the optical downlink channels (DL1-DLn) and a temporal separation of the optical uplink channels (UC1-UCn).

11 Claims, 2 Drawing Sheets

OPTICAL DOWNLINK SYSTEM

CROSS REFERENCE TO RELATED APPLICATION

Applicants hereby claim foreign priority benefits under U.S.C. §119 from European Patent Application No. EP 11 194 685.1 filed on Dec. 20, 2011, the contents of which are incorporated by reference herein.

FIELD OF THE INVENTION

The present invention relates to an optical downlink system and a method of optical data transmission between a ground terminal and a remote terminal, especially a communication satellite or a communication platform flying in airspace.

BACKGROUND OF THE INVENTION

Various systems for optical data transmission from a remote terminal to optical ground terminals are known and deployed. The primary function of these systems is to reliably transmit data from a data source to an optical ground terminal.

However, line-of sight communication contact with the optical ground terminal is limited during each flyover. Therefore the achieved speed of downlink channel is of upmost importance, since a great amount of data has to be transmitted to the optical ground terminal in a short amount of time for which a flyover lasts.

When scaling the downlink data rate from remote terminals to Earth, using optical frequencies, the required technical complexity, mass, power and volume for one on-board laser communication terminal cannot be smoothly upgraded, but it rather undergoes a technology-step once transmitter telescope diameters get so large that the required line-of-sight steering of the optical downlink beam cannot be achieved by a single high-precision actuator. At that technology step, nested control loops are required, usually comprising multi-axis course—and fine steering actuators together with complex optical beam routing and different kinds of optical sensors, altogether building up toward a complex on-board laser communication terminal that weighs several tens of kilograms and that requires dedicated satellite structural support for accommodation of large diameter telescopes.

It is known that mass increases with the telescope diameter ratio raised to approximately $3^{rd}$ power, thereby inherently leading to non-linear increase in involved launch cost for the spacecraft operator who wants to employ laser communication terminals.

Examples for larger laser communication terminals are available from space demonstration missions like SILEX, TerraSAR-X. Even though quasi-stationary, Alphasat communication satellites—even though not that limited by reduced line-of-sight times—also face the requirement of increased downlink capacity. In direct-to-Earth link scenarios, such large optical terminals that link to optical ground stations are costly because they include highly sophisticated technologies, in order to exploit to maximum extent all capabilities of costly larger space laser communication terminals, clearly for economical reasons.

Furthermore, optical communication devices -as any other complex systems—are prone to failure thereby making them less reliable. In addition, optical links have the further disadvantage that even in relatively good weather, the optical line-of-sight might be disturbed thereby interrupting communication and thus degrading the availability of the system. However, since the line-of sight communication contact is broken after a short amount of time of a flyover and can be established again only at the next flyover after a further revolution (or not even), the reliability of the transmission is essential.

The problem arising with above described technical features is to achieve lower technical entry levels for laser communication system usage that allow users to increase the laser communications capabilities according to their needs. Today this leads to design constraints tailored to "mission-only", involving each time high amounts of repeated development effort.

TECHNICAL PROBLEM TO BE SOLVED

The objective of the present invention is thus to provide a reliable optical downlink system of high downlink data-rate which offers increased availability.

It is also an objective of the present invention to provide a method of optical data transmission between a ground terminal and a remote terminal, the method ensuring high downlink data rates, while providing high reliability and increased availability.

SUMMARY OF THE INVENTION

The above-identified objectives are solved by an optical downlink system comprising a remote terminal with a number of n optical communication terminals (n being greater than or equal to 2) and a ground terminal with a cluster of n optical ground stations. Each optical communication terminal is connected with a corresponding optical ground station with one of n optical downlink channels. Furthermore each optical ground station being connected with a corresponding optical communication terminal with one of n optical uplink channels. The optical downlink channels are spatially separated from each other by means of the optical ground stations being located a certain distance apart from each other. The ground terminal is configured such as to synchronise the n optical ground stations such that a precise temporal separation is ensured between the n optical uplink channels by a time division multiple access scheme thereby avoiding overlap between the optical uplink channels.

The further objectives of the present invention are solved by a method of optical data transmission between a remote terminal having a number of n optical communication terminals (where n is greater than or equal to two) and a ground terminal comprising a cluster of n specially separated optical ground stations. The method comprising the steps:

establishing n optical downlink channels connecting each optical communication terminals with a corresponding optical ground station;

establishing n optical uplink channels connecting each optical ground station with a corresponding optical communication terminal;

transmit data from the remote terminal by the n optical communication terminals to the corresponding optical ground stations of the ground terminal;

sequentially transmit control data from the n individual optical ground stations via the corresponding optical uplink channels to the corresponding optical communication terminals by means of a precise temporal separation by a time division multiple access scheme thereby avoiding overlap between the optical uplink channels.

ADVANTAGEOUS EFFECTS

The present invention provides a groundbreaking approach to scalable optical downlink volumes and scalable data rate capacity per remote terminal for optical frequencies. Instead of re-design or delta-design by increase of amount of channels or by changing modulation format, the present invention uses the same hardware in a special combination, thereby achieving a cost-minimized approach toward directly scalable optical downlink capacity. The idea is not limited to satellite downlinks, it can be extended also to the use for downlinks from platforms flying in airspace. Key is to combine for a bi-directional, asymmetric laser communications link scenario the features of spatial separation characteristics of the ground station cluster with temporal separation on the optical uplink direction used on the remote terminal control data transmission and for beam steering purposes, applying further a special way of synchronized uplink laser modulation and detection.

In view of the above-identified objective and its solution as provided by the present invention, the most important advantage is that the system provides a highly increased data rate: increased by a factor of n times as compared to one single optical communication terminal on the remote terminal. At the same time this increase of data rate is coupled with merely a linear increase in weight of the remote terminal as compared to an increase to approximately $3^{rd}$ power in case of traditional data rate increase approaches.

Furthermore the use of a number of n optical communication terminals coupled with a cluster of optical ground stations ensures that the system including both the remote terminal and the ground terminal is more resistant to individual failures, making the system much more reliable.

In addition, the use of spatially separated ground stations reduces the risk of complete interruption of the communication between the remote terminal and ground terminal due to interruptions in the line-of-sight between remote and ground optical terminals, thereby improving the availability of the system.

By use of multiple optical communication terminals coupled with a cluster of optical ground stations provides great scalability of the communication system/method as well, the capacity being easily adjusted by addition of further optical communication terminals and corresponding optical ground stations. Upgrades of the system are therefore possible as opposed to known systems which would require exchanging the entire communication system.

It shall be noted that not only that the weight increases with the telescope diameter ratio raised to approximately $3^{rd}$ power, but the cost increase is also non-linear. Therefore employing an array of relatively low-cost optical communication terminals brings an inherent cost benefit in addition to savings in launch costs due to greatly reduced weight.

Maintenance is also made easier and less costly since preferably all optical communication terminals and all optical ground stations are of the same type.

BRIEF DESCRIPTION OF THE DRAWINGS

Further characteristics and advantages of the invention will in the following be described in detail by means of the description and by making reference to the drawings.

Note: The figures are not drawn to scale, are provided as illustration only and serve only for better understanding but not for defining the scope of the invention. No limitations of any features of the invention should be implied form these figures.

DESCRIPTION OF PREFERRED EMBODIMENTS

Certain terms will be used in this patent application, the formulation of which should not be interpreted to be limited by the specific term chosen, but as to relate to the general concept behind the specific term.

The term remote terminal shall be used to refer to any kind of remote communication terminals, such as—but not limited to—communication satellites at various altitudes above a planet or communication platform flying in airspace.

The present invention offers a completely new approach to increasing downlink capacity from remote terminals that weighs about an order of magnitude less than known large laser communication terminals of the same downlink capacity. Next to smallness and robustness that allow for a wider range of applications in space segment, a new level of versatility is achieved in combination with a network/cluster of relatively low-cost optical ground stations OGS, allowing even for small satellite platforms to embark large volume telemetry data downlinks at optical frequencies with hundreds of GBytes per day.

The optical downlink system 10 respectively the method of optical data transmission according to the present invention solve the above-identified "technology step problem" and corresponding non-linear impact on cost and risk in the following way: For optical downlinks from a remote terminal 20, several optical communication terminals OT1-OTn are combined to scale up in a linear way the achievable downlink data rate up to at least about one order of magnitude.

Figure 1:
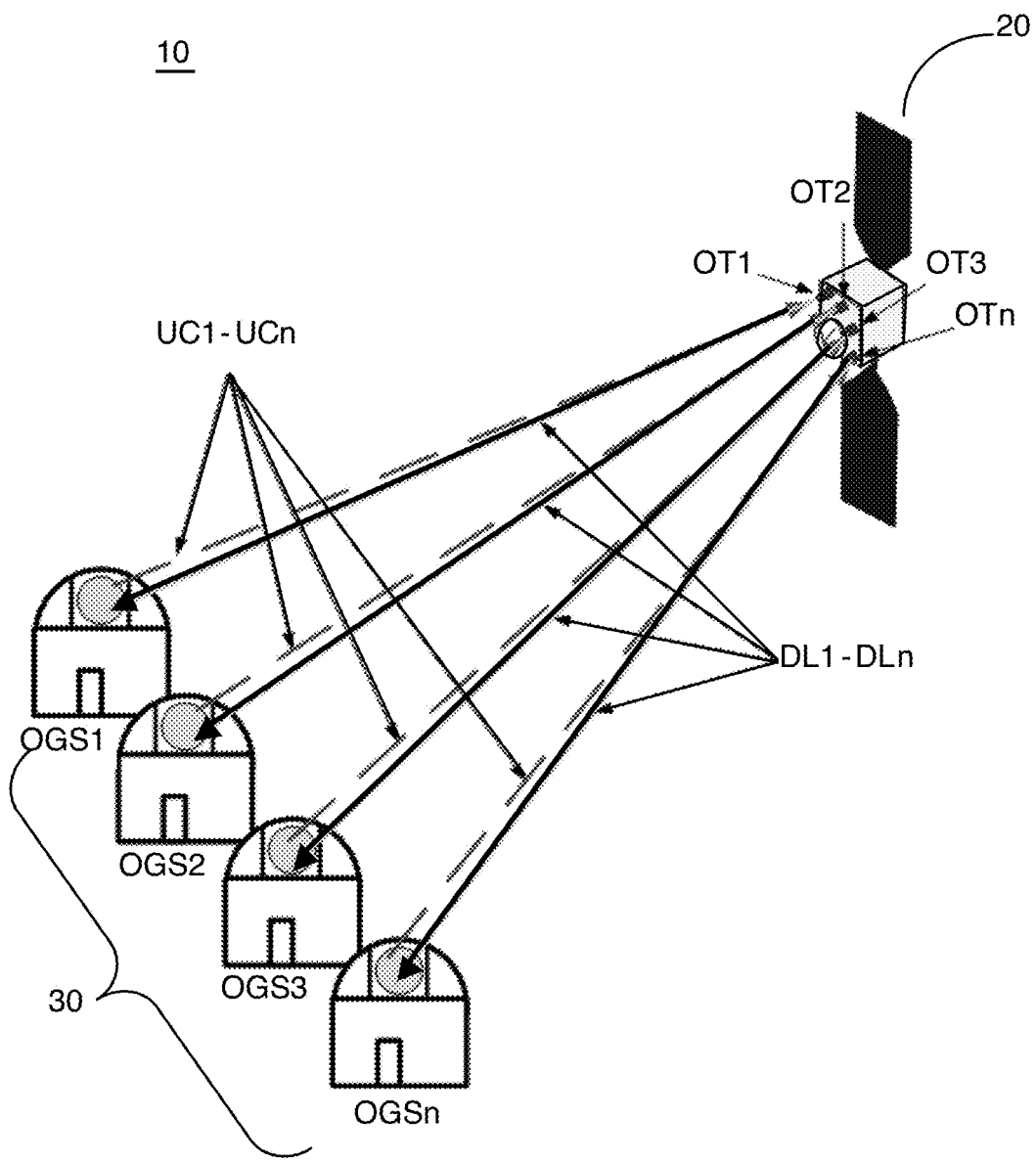
FIG. 1 shows a schematic overview of the optical communication system according to the present invention.

FIG. 1 shows a schematic overview of the optical communication system 10 according to the present invention comprising a remote terminal 20 with a number of n optical communication terminals OT1-OTn (where n is greater than or equal to two) and a ground terminal 30 with a cluster of n optical ground stations OGS1-OGSn. According to the present invention each optical communication terminals OT1-OTn of the remote terminal is "paired" with one optical ground stations OGS1-OGSn. However, for redundancy reasons, there might be additional optical communication terminals and/or one optical ground stations installed in the system without affecting the concept of the present invention. As from now the number n shall be the same, in other words there is a one-to-one relationship between the number of optical ground stations OGS1-OGSn and the number of optical communication terminals OT1-OTn respectively between the number of optical downlink channels DL1-DLn and the number of optical uplink channels UC1-UCn.

Downlink

Each optical communication terminal OT1-OTn is connected with a corresponding optical ground station OGS1-OGSn with one of n optical downlink channels DL1-DLn. Individually, these optical downlink channels DL1-DLn are of the known type, where each optical communication terminal OT1-OTn transmits data packets to the corresponding optical ground station OGS1-OGSn by means of one of the known optical modulation algorithms, such as (but not limited to) on-off-keying algorithm.

Figure 2:
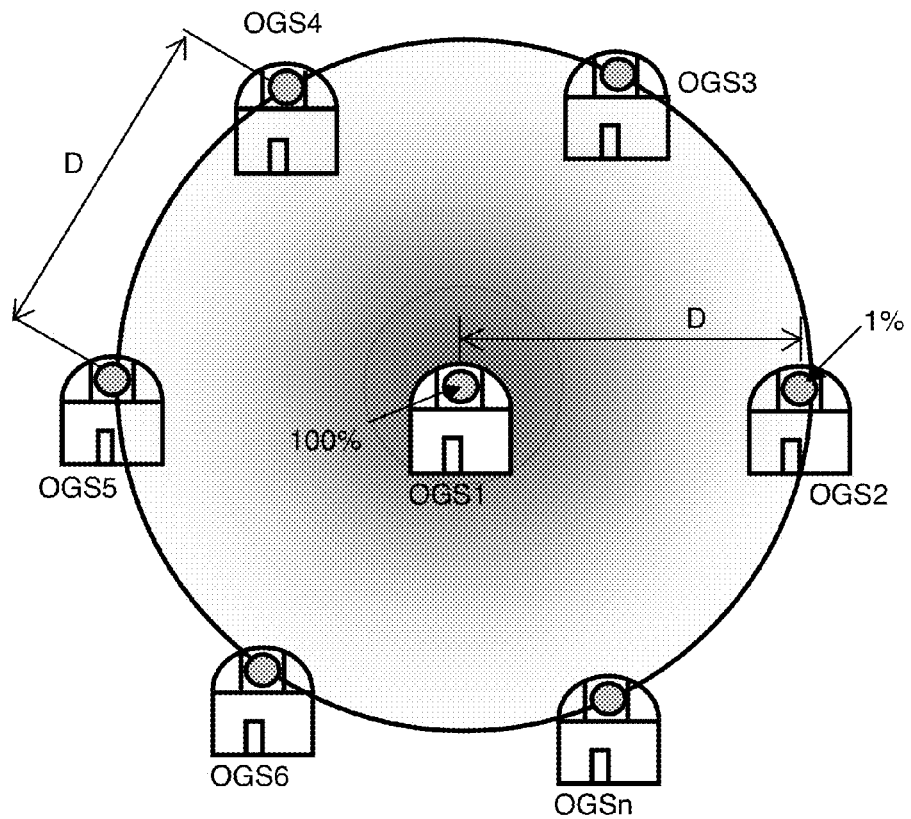
FIG. 2 illustrates an overview of the spatial separation of the optical ground stations of the ground terminal.

As illustrated on FIG. 1, the optical downlinks channels Dl1-DLn are directed simultaneously from multiple optical communication terminals OT1-OTn embarked on the same remote terminal 20 to a ground terminal 30 comprising a closely located cluster of optical ground stations OGS1-OGSn placed together at one site location, like shown in FIGS. 1 and 2. Thus the n optical communication terminals OT1-OTn of the remote terminal 20 are configured to simultaneously transmit payload data to the corresponding optical ground stations OGS1-OGSn of the ground terminal 30. Payload data shall be used here to refer to data that is to be transmitted from the remote terminal 20 down to the ground terminal 30. Control data shall refer to data that is additionally exchanged in order to ensure reliable, error-free transmission of the payload data.

Downlink—Spatial Separation

The downlink geometry makes use of the feature of narrow optical beam widths and the inherent opportunity of narrow spatial separation distances on ground without mutual interference at the ground stations OGS1-OGSn due to overlap of the beam cones corresponding to the individual optical downlink channels DL1-DLn. Thus the optical downlink channels DL1-DLn are spatially separated from each other by means of the optical ground stations OGS1-OGSn being located a certain distance apart from each other.

FIG. 2 illustrates an overview of this spatial separation of the optical ground stations OGS1-OGSn of the ground terminal 30. As shown on this figure, the optical ground stations OGS1-OGSn are located a distance D apart from each other. This minimum distance D is configured so as to be sufficiently high in order to ensure that, in view of the optical beam width of the optical downlink channels DL1-DLn and the resulting spot diameter, the optical receive power at any one of the optical ground stations OGS1-OGSn from its corresponding optical downlink channel DL1-DLn is at least one order of magnitude greater than the optical receive power from interference by any other optical downlink channels DL1-DLn. Optical receive power refers to the receiver optical power by an optical ground station. The optical receive power depends directly on the distance of the receiver from the centre of the optical beam, in that the greater the distance, the lower the optical receive power.

In the example shown on FIG. 2, the optical receiver power at optical ground station OGS1—located at the centre of the optical beam corresponding to optical downlink channel DL1 is not only one but two orders of magnitude stronger than the optical receiver power from the optical beam corresponding to optical downlink channel DL1 at any other ground station OGS2-OGSn. It shall be assumed as 100%, the receiving power from an optical beam corresponding to an optical downlink channel (here DL1) at the centre of the optical beam (which as described later is focused on the receiver of the optical ground station (here OGS1). In this case about 1% of that 100% of optical receive power from the optical beam shall be noticeable at any of the other optical ground stations (here OGS2-OGSn). In other words, the crosstalk/interference/overlap between the optical downlink channels is limited to about 1% of their respective optical power. This ensures that the each optical ground terminal OGS can reliably distinguish between its corresponding optical downlink channel DL and crosstalk/interference/overlap from the other optical downlink channels DL.

However, to ensure that the each optical ground terminal OGS can reliably distinguish between its corresponding optical downlink channel DL and crosstalk/interference/overlap from the other optical downlink channels DL, a ratio of about 1 to 10 between the optical receive power from the corresponding optical downlink channel and the optical receive power from interference is sufficient.

Uplink—Pointing-Acquisition-Tracking PAT

As shown on FIG. 1, in the reverse direction, each optical ground station OGS1-OGSn is connected with a corresponding optical communication terminal OT1-OTn with one of n optical uplink channels UC1-UCn. In the ground terminal 30 preferably one uplink laser beacon is provided per optical ground station OGS1-OGSn as an optical reference) or guidance beam) to the optical communication terminals OT1-OTn of the remote terminal 20 for accurate line-of-sight referencing. The n optical uplink channels UC1-UCn therefore comprise n laser beacons directed towards the remote terminal 20 for pointing-acquisition and tracking PAT by the optical communication terminals OT1-OTn in order to individually direct the optical communication terminals OT1-OTn towards the corresponding optical ground stations OGS1-OGSn. For this reason, the method of the present invention preferably further comprises the steps of pointing-acquisition and tracking PAT by the optical communication terminals OT1-OTn by means of the laser beacons of the corresponding optical ground stations OGS1-OGSn thereby individually directing the optical communication terminals OT1-OTn towards the corresponding optical ground stations OGS1-OGSn. As a consequence each pair of optical communication terminal OT and optical ground station OGS operate to some degree independently as regards to PAT procedures. This further improves reliability by redundancy and scalability as well. Thus both optical communication terminals and optical ground stations of the known type may be used if configured and synchronised appropriately.

Thus the n optical uplink channels UC1-UCn comprising n laser beacons are directed towards the remote terminal 20, the method of the present invention further comprising the steps of pointing-acquisition and tracking by the optical communication terminals OT1-OTn by means of the laser beacons of the corresponding optical ground stations OGS1-OGSn thereby individually directing the optical communication terminals OT1-OTn towards the corresponding optical ground stations OGS1-OGSn.

Uplink—Temporal Separation

The problem linking from several optical ground stations OGS1-OGSn simultaneously to the same remote terminal 20 is that all uplink laser beams of the optical uplink channels UC1-UCn will overlap at all optical communication terminals OT1-OTn of the remote terminal 20 and their corresponding detector fields of view and thereby lead to confusion where to track to and from which optical ground station OGS does which uplink signal come from. However the same approach of spatial separation of the ground stations in the case of the downlink channel DL can not be applied at the remote terminal 20 due to its reduced size. Thus present invention combines that spatial separation for the optical downlink channels DL1-DLn with precise temporal separation of the optical uplink channel UC1-UCn.

Therefore the ground terminal 30 is configured such as to synchronise the n optical ground stations OGS1-OGSn such that a precise temporal separation is ensured between the n optical uplink channels UC1-UCn by a time division multiple access scheme thereby avoiding overlap between the optical uplink channels UC1-UCn. The present invention thus avoids complex solutions for preventing overlap, such as using different optical channels or modifications of optical parameters. Instead, by time division multiple access, the same on-board hardware can be used in economical way. In order to achieve this, the ground terminal 30 comprises a sync unit, preferably as part of one of the n optical ground stations OGS1-OGSn (this being then the master ground station). The sync unit is configured to synchronise the n ground stations OGS1-OGSn so that at any moment in time, only one ground station OGS1-OGSn is transmitting, thus providing for the temporal separation of the n optical uplink channels UC1-UCn, ensuring that only one of the n optical uplink channels UC1-UCn is active at a time.

Thus the optical data transmission method between the remote terminal 20 having a number of n optical communication terminals OT1-OTn and the ground terminal 30 with the cluster of n specially separated optical ground stations OGS1-OGSn comprises the steps:

Establishing n optical downlink channels DL1-DLn connecting each optical communication terminals OT1-OTn with the corresponding optical ground station OGS1-OGSn;

Establishing n optical uplink channels UC1-UCn connecting each optical ground station OGS1-OGSn with a corresponding optical communication terminal OT1-OTn;

transmit payload data from the remote terminal 20 by the n optical communication terminals OT1-OTn to the corresponding optical ground stations OGS1-OGSn of the ground terminal 30;

sequentially transmit control data from the n individual optical ground stations OGS1-OGSn via the corresponding optical uplink channels UC1-UCn to the corresponding optical communication terminals OT1-OTn by means of a precise temporal separation by a time division multiple access scheme thereby avoiding overlap between the optical uplink channels UC1-UCn.

Temporal Separation with Pulse Position Modulation PPM

Figure 3A:
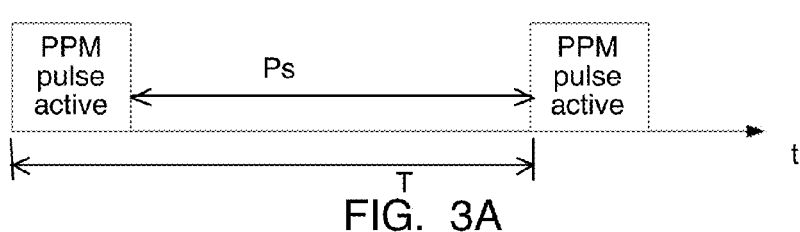
FIG. 3A depicts a representation of a pulse position modulated signal of a single optical downlink channel of one optical uplink channel.

In a particularly preferred embodiment of the present invention, the optical uplink channels UC1-UCn are pulse position modulated PPM signals. FIG. 3A depicts a representation of a pulse position modulated PPM signal of a single optical downlink channel DL of one optical uplink channel UC1. As shown on this figure, the PPM signal has a period T. By the nature of the PPM modulation, there is a substantial phase of pulse silence Ps between consecutive pulses of the PPM signal.

Figure 3B:
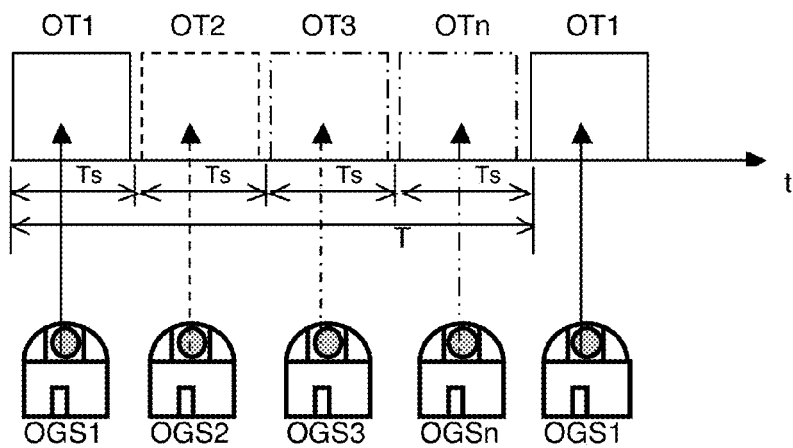
FIG. 3B illustrates the temporal separation of the optical uplink channels using a time division multiple access scheme, depicting a preferred embodiment using pulse position modulation of the optical uplink channels, each uplink channel having a specific time slot assigned corresponding to the phases of pulse silence of the other uplink channels.

As illustrated on FIG. 3B, the n optical ground stations OGS1-OGSn are synchronised such that pulses of each of the pulse position modulated PPM signals of any one of the n uplink channels UC1-UCn are emitted sequentially during the phases of pulse silence Ps of the other uplink channels UC1-UCn, by dividing the period T of the pulse position modulated PPM signals to the number n of optical uplink channels UC1-UCn and assigning each optical ground stations OGS1-OGSn a dedicated time slot Ts less than or equal to T/n.

Thus in the preferred method of the present invention the n optical ground stations OGS1-OGSn modulate the n optical uplink channels UC1-UCn according to a pulse position modulated PPM scheme. In addition, the sync unit controls the n optical ground stations OGS1-OGSn such that pulses of each of the pulse position modulated PPM signals of any one of the n uplink channels UC1-UCn are emitted sequentially during phases of pulse silence Ps of the other uplink channels UC1-UCn, by dividing the period T of the pulse position modulated PPM signals to the number n of optical uplink channels UC1-UCn and assigning each optical ground stations OGS1-OGSn a dedicated time slot Ts less than or equal to T/n. Choosing the time slot TS slightly less than T/n ensures greater separation of the pulses belonging to one or the other uplink channel UC, easing the requirements on the synchronisation.

Synchronisation—at the Ground Terminal 30

In a particularly preferred embodiment of the present invention, one of the n optical communication terminals OT1-OTn of the remote terminal 20 is a master optical communication terminal configured to receive the laser beacon of the optical uplink channel UC1-UCn from the master ground station and distribute a clock synchronization signal to the other optical communication terminals OT1-OTn of the remote terminal 20, thereby initiating a gated viewing of the n optical communication terminals OT1-OTn, where each optical communication terminal OT1-OTn sequentially receives signals from the corresponding optical ground station OGS1-OGSn.

To ensure synchronisation, a sync unit (preferably part of an optical ground station OGS acting as master ground station) synchronises the n ground stations OGS1-OGSn so that at any moment in time, only one ground station OGS1-OGSn is transmitting a pulse, thus providing for the temporal separation of the n optical uplink channels UC1-UCn, by ensuring that only one of the n optical uplink channels UC1-UCn is active at a time.

Synchronisation—at the Remote Terminal 20

For synchronising the remote terminal 20, one of the n optical communication terminals OT1-OTn of the remote terminal 20 is a master optical communication terminal and the method of the invention further comprises the following steps:

Receive the laser beacon of the optical uplink channel UC1-UCn from the master ground station;

Distribute a clock synchronization signal to the other optical communication terminals OT1-OTn of the remote terminal 20; thereby initiating a gated viewing of the n optical communication terminals OT1-OTn, where each optical communication terminals OT1-OTn sequentially receiving signals from the corresponding optical ground station OGS1-OGSn.

Spatial Separation and Temporal Separation

Combining spatial separation of the downlink channels DL1-DLn with temporal separation of the uplink channels UC1-UCn, the n optical communication terminals OT1-OTn of the remote terminal 20 simultaneously transmit payload data to the corresponding optical ground stations OGS1-OGSn of the ground terminal 30; while the optical ground stations OGS1-OGSn sequentially transmit control signals to the corresponding optical communication terminals OT1-OTn, such as automated repeat request ARQ signals for requesting retransmission of lost/erroneously received data packets from the corresponding optical communication terminal OT1-OTn.

Optionally, in order to increase availability of the downlink communication, the remote terminal re-routes data to be transmitted by any of the n optical communication terminals OT1-OTn if the corresponding optical downlink channels DL1-DLn is unavailable and/or unreliable, thereby achieving redundancy and greater availability of the optical data transmission.

QUANTITATIVE EXAMPLE

A quantitative example is given, using the four-fold link scenario shown in the FIGS. 1 and 3B. Using a 64-PPM at 20 kHz pulse repetition rate with 100 ns pulse duration, each active pulsing period/time slot Ts of a ground beacon laser of the optical ground stations OGS would then last less than 7 μs including residual buffer time. This would allow for four optical ground stations OGS to be synchronized, including additional 5 μs residual buffer time between adjacent active pulse time windows to relax synchronization accuracy. At higher available synchronisation accuracy, the buffer margin, together with an adapted PPM scheme could be used for even larger number of simultaneous optical downlink channels DL.

Assuming a sensible baseline of 2.5 Gbit/s downlink rate per single optical communication terminal OT on the same remote terminal 20, this rate could then be increased to a total of 10 Gbit/s downlink rate by using four identical optical communication terminals OT1-OT4 and four identical optical ground stations OGS1-OGS4 during the same passage over ground. The amount of four is of course only for illustration purpose and the application could use a greater or smaller number than shown.

For comparison, the maximum optical downlink capability achieved today in an experimental demonstration amounts to 6.2 Gbit/s from a large space terminal. At this comparison, the on-board mass footprint of four of the optical communication terminals OT1-OT4 is only about half of that of a single, but large terminal.

In this quantitative example-assuming a remote terminal at an altitude of 700 km in polar inclined low earth orbit LEO—at a distance D of 150 m from the centre of the optical beam, the optical receive power would be about 1% of the 100% receive power at the centre of the beam.

Note: Inherently, the feature of using multiple small terminals also reduces risk of single item failure, providing an option to relax redundancy constraints per single optical communication terminal OT.

Note also: The amount of downlink data rate per passage could be further increased by moving to another modulation scheme and keep the same small physical footprint at the remote terminal 20.

It will be understood that many variations could be adopted based on the specific structure hereinbefore described without departing from the scope of the invention as defined in the following claims.

REFERENCE LIST optical downlink system 10
remote terminal 20
optical communication terminal OT1-OTn
ground terminal 30
optical ground station OGS1-OGSn
optical downlink channels DL1-DLn
optical uplink channels UC1-UCn
period (of PPM signal) T
pulse silence (of PPM signal) Ps
time slot Ts

The invention claimed is:

1. Optical downlink system (10) comprising:
 a remote terminal (20) comprising a number of n optical communication terminals (OT1-OTn), where n is greater than or equal to two;
 a ground terminal (30) comprising a cluster of n optical ground stations (OGS1-OGSn), and one of the n optical ground stations (OGS1-OGSn) being a master ground station that further comprises a sync unit that is configured to synchronise the n ground stations (OGS1-OGSn) so that any moment in time, only one ground station (OGS1-OGSn) is transmitting, thus providing for temporal separation of the n optical uplink channels (UC1-UCn) and ensuring that only one of the n optical uplink channels (UC1-UCn) is active at a time;
 each optical communication terminal (OT1-OTn) being connected with a corresponding optical ground station (OGS1-OGSn) with one of n optical downlink channels (DL1-DLn); and
 each optical ground station (OGS1-OGSn) being connected with a corresponding optical communication terminal (OT1-OTn) with one of n optical uplink channels (UC1-UCn) that are pulse position modulated (PPM) signals;
 wherein the optical downlink channels (DL1-DLn) are spatially separated from each other by means of the optical ground stations (OGS1-OGSn) being located a certain distance apart from each other; and
 wherein the ground terminal (30) is configured such as to synchronise the n optical ground stations (OGS1-OGSn) such that a precise temporal separation is ensured between the n optical uplink channels (UC1-UCn) by a time division multiple access scheme, wherein pulses of each of the pulse position modulated PPM signals of any one of the n uplink channels (UC1-UCn) are emitted sequentially during phases of pulse silence (Ps) of the other uplink channels (UC1-UCn), by dividing the period (T) of the pulse position modulated (PPM) signals to the number n of optical uplink channels (UC1-UCn) and assigning each optical ground stations (OGS1-OGSn) a dedicated time slot (Ts) less than or equal to T/n, thereby avoiding overlap between the optical uplink channels (UC1-UCn).

2. Optical downlink system (10) according to claim 1, characterised in that the n optical uplink channels (UC1-UCn) comprise n laser beacons directed towards the remote terminal (20) for pointing-acquisition and tracking by the optical communication terminals (OT1-OTn) in order to individually direct the optical communication terminals (OT1-OTn) towards the corresponding optical ground stations (OGS1-OGSn).

3. Optical downlink system (10) according to claim 2, characterised in that one of the n optical communication terminals (OT1-OTn) of the remote terminal (20) is a master optical communication terminal configured to receive the laser beacon of the optical uplink channel (UC1-UCn) from the master ground station and distribute a clock synchronization signal to the other optical communication terminals (OT1-OTn) of the remote terminal (20), thereby initiating a gated viewing of the n optical communication terminal (OT1-OTn), where each optical communication terminals (OT1-OTn) sequentially receives signals from the corresponding optical ground station (OGS1-OGSn).

4. Optical downlink system (10) according to claim 1, characterised in that the n optical communication terminals (OT1-OTn) of the remote terminal (20) are configured to simultaneously transmit payload data to the corresponding optical ground stations (OGS1-OGSn) of the ground terminal (30), and the optical ground stations (OGS1-OGSn) are configured to sequentially transmit control signals to the corresponding optical communication terminals (OT1-OTn), such as automated repeat request ARQ signals for requesting retransmission of lost/erroneously received data packets from the corresponding optical communication terminal (OT1-OTn).

5. Optical downlink system (10) according to claim 1, characterised in that the optical ground stations (OGS1-OGSn) are located a distance (D) apart from each other, said distance (D) being sufficiently high in order to ensure that the optical receive power at any one of the optical ground stations (OGS1-OGSn) from its corresponding optical downlink channel (DL1-DLn) is at least one order of magnitude greater than the optical receive power from interference by any other optical downlink channels (DL1-DLn).

6. Optical downlink system (10) according to claim 1, characterised in that the remote terminal (20) is a communication satellite or a communication platform flying in airspace.

7. Method of optical data transmission between a remote terminal (20) having a number of n optical communication terminals (OT1-OTn), where n is greater than or equal to two, and a ground terminal (30) comprising a cluster of n specially separated optical ground stations (OGS1-OGSn) comprising the steps:
   establishing n optical downlink channels (DL1-DLn) connecting each optical communication terminals (OT1-OTn) with a corresponding optical ground station (OGS1-OGSn);
   establishing n optical uplink channels (UC1-UCn) connecting each optical ground station (OGS1-OGSn) with a corresponding optical communication terminal (OT1-OTn);
   transmitting payload data from the remote terminal (20) by the n optical communication terminals (OT1-OTn) to the corresponding optical ground stations (OGS1-OGSn) of the ground terminal (30);
   sequentially transmitting control data from the n individual optical ground stations (OGS1-OGSn) via the corresponding optical uplink channels (UC1-UCn) to the corresponding optical communication terminals (OT1-OTn) by means of a precise temporal separation by a time division multiple access scheme thereby avoiding overlap between the optical uplink channels (UC1-UCn)
   wherein a sync unit synchronises the n ground stations (OGS1-OGSn) so that at any moment in time, only one ground station (OGS1-OGSn) is transmitting, thus providing for the temporal separation of the n optical uplink channels (UC1-UCn), ensuring that only one of the n optical uplink channels (UC1-UCn) is active at a time; and
   wherein the n optical ground stations (OGS1-OGSn) modulate the n optical uplink channels (UC1-UCn) according to a pulse position modulated PPM scheme, wherein the sync unit controls the n optical ground stations (OGS1-OGSn) such that pulses of each of the pulse position modulated PPM signals of any one of the n uplink channels (UC1-UCn) are emitted sequentially during phases of pulse silence (Ps) of the other uplink channels (UC1-UCn), by dividing the period (T) of the pulse position modulated PPM signals to the number n of optical uplink channels (UC1-UCn) and assigning each optical ground stations (OGS1-OGSn) a dedicated time slot (Ts) less than or equal to T/n.

8. Method of optical data transmission according to claim 7, characterised in that the n optical uplink channels (UC1-UCn) comprising n laser beacons are directed towards the remote terminal (20), the method further comprising the steps of pointing-acquisition and tracking by the optical communication terminals (OT1-OTn) by means of the laser beacons of the corresponding optical ground stations (OGS1-OGSn) thereby individually directing the optical communication terminals (OT1-OTn) towards the corresponding optical ground stations (OGS1-OGSn).

9. Method of optical data transmission according to claim 8, characterised in that one of the n optical communication terminals (OT1-OTn) of the remote terminal (20) is a master optical communication terminal, the method further comprises the following steps:
   receive the laser beacon of the optical uplink channel (UC1-UCn) from the master ground station;
   distribute a clock synchronization signal to the other optical communication terminals (OT1-OTn) of the remote terminal (20), thereby initiating a gated viewing of the n optical communication terminals (OT1-OTn), where each optical communication terminals (OT1-OTn) sequentially receiving signals from the corresponding optical ground station (OGS1-OGSn).

10. Method of optical data transmission according to claim 7, characterised in that:
   the n optical communication terminals (OT1-OTn) of the remote terminal (20) simultaneously transmit payload data to the corresponding optical ground stations (OGS1-OGSn) of the ground terminal (30); and
   the optical ground stations (OGS1-OGSn) sequentially transmit control signals to the corresponding optical communication terminals (OT1-OTn), such as automated repeat request ARQ signals for requesting retransmission of lost/erroneously received data packets from the corresponding optical communication terminal (OT1-OTn).

11. Method of optical data transmission according to claim 7, characterised in that the remote terminal (20) re-routes data to be transmitted by any of the n optical communication terminals (OT1-OTn) if the corresponding optical downlink channels (DL1-DLn) is unavailable and/or unreliable, thereby achieving redundancy and greater availability of the optical data transmission.

* * * * *